United States Patent
Huijsing et al.

(10) Patent No.: US 12,195,182 B2
(45) Date of Patent: Jan. 14, 2025

(54) AIRCRAFT CABIN EQUIPMENT USING VISIBLE LIGHT COMMUNICATION

(71) Applicant: B/E Aerospace, Inc., Winston Salem, NC (US)

(72) Inventors: Hans Huijsing, Nieuwegein (NL); Varun Raman, The Hague (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 22 days.

(21) Appl. No.: 18/169,043

(22) Filed: Feb. 14, 2023

(65) Prior Publication Data

US 2023/0348060 A1    Nov. 2, 2023

(30) Foreign Application Priority Data

Apr. 29, 2022  (EP) .................................... 22170856

(51) Int. Cl.
*B64D 11/00* (2006.01)

(52) U.S. Cl.
CPC ...... *B64D 11/00* (2013.01); *B64D 2011/0038* (2013.01)

(58) Field of Classification Search
CPC .............. B64D 2011/0038; B64D 2011/0053
See application file for complete search history.

(56) References Cited

U.S. PATENT DOCUMENTS

| | | | |
|---|---|---|---|
| 8,686,876 B2 | 4/2014 | Shiomori et al. | |
| 10,727,941 B1 | 7/2020 | Kanagarajan | |
| 11,019,691 B1 | 5/2021 | van Oostrom | |
| 11,177,880 B2 | 11/2021 | Hull et al. | |
| 2011/0148664 A1* | 6/2011 | Shiomori | B64D 11/00155 340/945 |
| 2019/0223232 A1* | 7/2019 | Murakami | H04W 12/06 |
| 2020/0266892 A1 | 8/2020 | Schwartz et al. | |
| 2021/0387748 A1 | 12/2021 | Vermeulen et al. | |

FOREIGN PATENT DOCUMENTS

| | | |
|---|---|---|
| EP | 2393225 | 7/2011 |
| EP | 3422604 | 3/2020 |

OTHER PUBLICATIONS

Lee et al. "26 Gbit/s LiFi System With Laser-Based White Light Transmitter." Journal of Lightwave Technology, vol. 40, No. 5. Mar. 2022. (Year: 2022).*

Jiang et al. "Robust and Low-Complexity Timing Synchronization for DCO-OFDM LiFi Systems." IEEE Journal on Selected Areas in Communications, vol. 369, No. 1. Jan. 2018. (Year: 2018).*

(Continued)

*Primary Examiner* — Michael C Zarroli
*Assistant Examiner* — Ka Chun Leung
(74) *Attorney, Agent, or Firm* — SNELL & WILMER L.L.P.

(57) ABSTRACT

An aircraft cabin equipment system comprises a light fitting for illuminating an aircraft cabin by emitting visible light. The light fitting is configured to broadcast a time signal by modulating an intensity of the emitted visible light. The aircraft cabin equipment system comprises an aircraft cabin device configured to detect visible light emitted by the light fitting and to determine the time signal from the detected visible light.

13 Claims, 2 Drawing Sheets

(56) References Cited

OTHER PUBLICATIONS

European Patent Office, European Search Report dated Nov. 7, 2022 in Application No. 22170856.3.
Peng Deng, et al., The Pennsylvania State University, University Park, PA, Electronic ISBN: 978-1-5090-2149-9, "Real-Time Software-Defined Single-Carrier Qam Mimo Visible Light Communication System," Apr. 19-21, 2016 (2016 IEEE) Integrated Communications Navigation and Surveillance (ICNS) Conference, pp. 5A3-1 to 5A3-11.

* cited by examiner

AIRCRAFT CABIN EQUIPMENT USING VISIBLE LIGHT COMMUNICATION

CROSS-REFERENCE TO RELATED APPLICATIONS

This application claims priority to, and the benefit of, EP patent application Ser. No. 22/170,856.3, filed Apr. 29, 2022 and entitled "AIRCRAFT CABIN EQUIPMENT," which is incorporated by reference herein in its entirety for all purposes.

FIELD

The present disclosure relates to aircraft cabin equipment systems.

BACKGROUND

The cabins of aircraft such as commercial passenger aircraft typically feature a large number of devices. For instance, galleys on commercial passenger aircraft normally feature several appliances such as ovens, refrigeration equipment and beverage preparation equipment (e.g. coffee makers). It is useful to have a record of when and how these devices are operated, and any errors or faults that occur during use.

It would be convenient for the devices themselves to log their operation including any faults that occur and the times at which they occurred. However, many aircraft cabin devices do not maintain accurate clocks and those that do are not normally able to keep time through periods when aircraft systems are powered down, due to restrictions on battery use in aircraft cabins. Moreover, aircraft often travel through many times zones, so even if cabin devices were able to maintain accurate clocks these would need regular manual updates to keep up with time zone changes.

An improved approach may be desired.

SUMMARY

According to a first aspect of the present disclosure there is provided an aircraft cabin equipment system comprising:
  a light fitting for illuminating an aircraft cabin by emitting visible light, said light fitting being configured to broadcast a time signal by modulating an intensity of the emitted visible light; and
  an aircraft cabin device configured to detect visible light emitted by the light fitting and to determine the time signal from the detected visible light.

It will be recognized by those skilled in the art that the system enables the aircraft cabin device to keep accurate time during aircraft operation without the need for battery power or manual updates of the cabin devices. The use of a light fitting to provide the time signal may be particularly convenient, as aircraft cabins require illumination and thus typically already include the necessary fixture points and power connections for a light fitting. The use of visible light to broadcast the time signal also avoids strict RF emissions rules that are often enforced in aircraft cabins. Using a broadcast rather than a dedicated device connection may make the system simpler to operate and/or more reliable. The system may be convenient to retrofit onto older aircraft because only the light fitting may need to be updated.

Moreover, even on newer aircraft that feature dedicated wired or wireless data networks for communicating with cabin devices, broadcasting the time signal from the light fitting may still be advantageous. It may improve reliability by providing an independent communication mechanism for time information (e.g. that may not conflict with existing communication networks such as Wi-Fi), and it may facilitate the connection of new devices to an existing data network by providing time information that may be required for authentication. It may also be resilient to tampering efforts because communication using visible light is reasonably uncommon and may be inherently more difficult to disrupt than other communication mechanisms such as Wi-Fi.

The time signal may include information indicating a time and/or date. The time signal may include information indicating a current aircraft time and/or date, so that the aircraft cabin device can coordinate its timing with that of other devices on the aircraft. The time signal may include information indicating a current time according to a time standard such as Coordinated Universal Time (UTC) or according to a particular time zone (e.g. corresponding to the aircraft's origin, destination, or current location). The time signal may include a timestamp (e.g. of a current time) and/or a datestamp (e.g. of a current date).

The aircraft cabin equipment system may include only one aircraft cabin device configured to detect the light emitted by the light fitting. In other words, the light fitting may be arranged to broadcast the time signal to only a single aircraft cabin device. However, in a set of examples, the aircraft cabin equipment system comprises a plurality of aircraft cabin devices, each aircraft cabin device being configured to detect visible light emitted by the light fitting and to determine the time signal from the detected visible light. Because the light fitting broadcasts the time signal (i.e. forming a one-to-many communication channel), little or no modification may be needed to use the light fitting with a large number of cabin devices.

The system preferably enables only one-directional communication between the light fitting and the aircraft cabin device(s) using modulated visible light. In other words, the system may be configured for simplex communication (i.e. one-way communication) between the light fitting and the aircraft cabin device(s). Enabling only one-way visible light communication from the light fitting to the aircraft cabin device(s) may simplify installation and/or operation, and may improve security. The aircraft cabin device(s) may be unable to transmit modulated visible light.

In a set of examples, the or each aircraft cabin device comprises an internal clock. The internal clock may comprise a crystal oscillator based clock (e.g. a quartz clock). The internal clock may be configured to keep time (i.e. maintain an estimate of the current time) whenever the aircraft cabin device is powered. For instance, the internal clock may not operate when the aircraft is not actively in use.

The or each aircraft cabin device may be arranged to synchronize its internal clock using the time signal. In other words, the aircraft cabin device may be arranged to adjust or overwrite a time estimate held by the internal clock based on time information indicated by the time signal (e.g. a current time). Providing an internal clock that is synchronized with the time signal allows the aircraft cabin device to accurately keep time without the need for manual clock updates and corrections, and allows aircraft cabin devices to keep an estimate of the current time even when the light fitting is dimmed, off, or obstructed.

The light fitting may be configured to broadcast an initial time signal when the aircraft is started up and the light fitting is switched on. In some examples, this is the only time signal broadcast by the light fitting. For instance, the aircraft cabin device may use the initial time signal to perform an initial synchronization of its internal clock on start-up, and then keep time using the internal clock for the rest of the flight without further synchronizations.

However, in a set of examples the light fitting is configured to broadcast, successively, a plurality of time signals. For instance, the light fitting may be configured to continually update the time signal that is broadcast (e.g. to broadcast a new time signal at least every minute, every second, every 0.1 seconds or even more frequently). Correspondingly, the aircraft cabin device may be arranged to determine a plurality of successive time signals from the detected visible light. This may allow the aircraft cabin device to be more accurately informed of the current time (e.g. enabling an internal clock to keep more accurate time).

In such examples, the aircraft cabin device may be arranged to repeatedly synchronize its internal clock using time signals broadcast throughout aircraft operation (e.g. throughout the course of a flight). The internal clock may thus be kept updated on the current time and any changes in time zone without the need for manual updates.

The light fitting may comprise a clock. The light fitting may be configured to generate the time signal using the clock. The light fitting may be configured to generate the time signal using one or more external sources. For instance, the light fitting may be configured to receive time information from an external timing source and use this to generate the time signal and/or use this to calibrate or synchronize a clock. Alternatively, the light fitting may simply receive the time signal itself from an external timing source. Possible timing sources include an aircraft data network, an aircraft data management system or a navigation device such as a global navigation satellite system (GNSS) receiver (e.g. GPS, GLONASS, Galileo) or a GNSS satellite. The aircraft cabin equipment system may comprise one or more such timing sources configured to provide time information and/or the time signal to the light fitting.

The light fitting may broadcast time signals continuously when the light fitting is emitting visible light. Alternatively, the light fitting may broadcast time signals intermittently. In some examples, the light fitting is dimmable (e.g. to allow the cabin light level to be reduced at particular points during flight). In some examples, the light fitting is configured to continue to broadcast the time signal when the light fitting is dimmed. In other examples the light fitting stops broadcasting the time signal when the light fitting is dimmed (e.g. to mitigate errors in determining the time signal caused by a reduced signal to noise ratio).

In a set of examples, the aircraft cabin equipment system includes a single light fitting configured to broadcast the time signal. This may be simple to implement and sufficient for good coverage of one or more areas of an aircraft cabin. On some aircraft one light fitting may be sufficient to cover the whole cabin. In some examples the aircraft cabin equipment system includes a plurality of light fittings configured to illuminate an aircraft cabin by emitting visible light, each light fitting being configured to broadcast the time signal by modulating an intensity of the emitted visible light. Using multiple light fittings, with each one broadcasting the same time signal may enable excellent coverage in even large aircraft cabins, and/or the elimination of blind spots that are difficult to illuminate with a single light fitting.

As explained above, it is often useful for aircraft cabin devices to keep a log of their operation. In a set of examples, the aircraft cabin device is configured to generate a time-stamped event log using the time signal. In other words, the aircraft cabin device may be configured to keep a record of device events and the times at which the device events happened. For instance, the aircraft cabin device may log an event with a timestamp derived from the time signal received most recently before the event happened. Alternatively, the aircraft cabin device may be configured to time-stamp events in the event log using an internal clock that is synchronized using time signals. Keeping an event log with accurate time stamps may help with device monitoring and fault detection.

In examples featuring multiple aircraft cabin devices, each aircraft cabin device may be configured to generate a time-stamped event log using the time signal. In such examples, the event logs from different devices can be easily compared as they are all time-stamped based on a common timing source, e.g. allowing contemporaneous events on different devices to be identified. This may help with fault detection and diagnosis. Event logs showing that similar error events happened on different devices at precisely the same time may allow a technician to deduce that the errors had a common external cause, and to identify and resolve this.

Some aircraft feature data networks for communicating with cabin devices, such as wired networks (e.g. Ethernet) or wireless networks (e.g. Wi-Fi). In a set of examples, the aircraft cabin device is arranged to connect to an aircraft data network and to use the time signal when connecting to the aircraft data network. For instance, the aircraft cabin device may be configured to perform an authentication process that requires an accurate measure of the current time to connect to the aircraft data network (e.g. for certificate validation). Additionally or alternatively, the aircraft cabin device may use an accurate estimate of the current time derived from the time signal to identify times in which the data network is active (e.g. data transfer periods in a network that uses a discontinuous reception protocol).

The aircraft cabin device may be configured to connect to the aircraft data network as part of an initial commissioning process when the aircraft cabin device is first installed, every time the aircraft cabin device is powered, or even multiple times during a flight. Using the broadcast time signal mitigates the need for manual time programming in such cases.

In a set of examples, the light fitting is configured to broadcast additional information by modulating the intensity of emitted visible light. For instance, the light fitting may be configured to broadcast flight information such as flight number, origin, destination, departure time and/or arrival time by modulating the intensity of emitted visible light. Additionally or alternatively the light fitting may be configured to broadcast network authentication information such as network names, usernames, passwords and/or certificates. The light fitting may store additional information such as flight information or authentication itself (e.g. added by manual user input to the light fitting). The light fitting may receive additional information from one or more external data sources such as an aircraft data network, an aircraft data management system or a navigation device such as a global navigation satellite system (GNSS) receiver (e.g. GPS, GLONASS, Galileo) or a GNSS satellite. The aircraft cabin equipment system may comprise one or more such data sources configured to provide additional information to the light fitting.

In some such examples, the aircraft cabin device is configured to determine the additional information from the detected visible light. In examples featuring a plurality of aircraft cabin devices, some or all of the aircraft cabin devices may be configured to determine the additional information from the detected visible light. The additional information may be used, for instance, for producing more useful event logs. For example, the aircraft cabin device may be configured to add flight information broadcast by the light fitting to event log entries to help with future data sorting and analysis. In another set of examples, additionally or alternatively, the aircraft cabin device may be configured to use network authentication information broadcast by the light fitting when connecting to an aircraft data network. The aircraft cabin device may comprise a data network interface for connecting to the aircraft data work. Broadcasting network authentication information with the light fitting may allow more secure data networks to be used on the aircraft without sacrificing convenience. For instance, the network could change its authentication credentials (e.g. password) regularly, with the light fitting broadcasting the new credentials to the aircraft cabin device via the modulated visible light (i.e. out of band).

The aircraft cabin equipment system may be suitable for use anywhere in an aircraft cabin. In a set of examples the aircraft cabin device is an aircraft galley device such as an oven, refrigeration equipment (e.g. a chiller) or beverage preparation equipment (e.g. a coffee maker). Alternatively, the aircraft cabin device may comprise an add-on device (e.g. a logging device) for connecting to an existing aircraft cabin device such as a galley device (e.g. to add logging capabilities to the existing aircraft cabin device).

The aircraft cabin device may comprise no wired data inputs. The aircraft cabin device may comprise no wireless data inputs other than for detecting the visible light. For instance, the aircraft cabin device may comprise a legacy cabin device without data communication functions, to which a visible light detection mechanism has been retrofit.

The aircraft cabin device may comprise any means known in the art per se that is suitable for detecting the intensity of visible light. For instance, the aircraft cabin device may comprise a photodiode or a phototransistor.

The light fitting may comprise any means known in the art per se that is suitable for emitting visible light and for modulating the intensity of said visible light (i.e. light in the visible portion of the electromagnetic spectrum, e.g. having a wavelength between 300 nm and 1100 nm or between 350 nm and 750 nm). In some examples, the light fitting is configured to modulate emitted light according to a Li-Fi protocol. The light fitting may be configured to modulate the intensity of the emitted light at a frequency that is sufficiently high so as not to be visually discernible. For instance, the light fitting may be configured to modulate the intensity of the emitted light at a frequency of at least 50 Hz, at least 100 Hz, at least 1 kHz, at least 10 kHz, at least 100 kHz, at least 1 MHz, or at least 10 MHz or more.

In a set of examples, the light fitting comprises one or more light emitting diodes (LEDs). The light fitting preferably is configured to produce a light output of at least 100 lumens and further preferably is configured to produce a light output of at least 250 lumens. In a set of examples, the light fitting is mounted in or on the ceiling of an aircraft cabin. This may be a particularly useful mounting position for broadcasting the time signal over a large area (e.g. allowing a large number of devices to be served by a single light fitting). A ceiling mounted light fitting may also be less susceptible to disruptions to the emitted light from cabin staff and/or passengers moving around the cabin. Alternatively, the light fitting may be mounted in or on a cabin wall or a bulkhead, or in or on a cabin floor. The light fitting may comprise a free-standing and/or movable fitting (e.g. a table lamp).

Features of any aspect or example described herein may, wherever appropriate, be applied to any other aspect or example described herein. Where reference is made to different examples, it should be understood that these are not necessarily distinct but may overlap.

BRIEF DESCRIPTION OF THE DRAWINGS

One or more non-limiting examples will now be described, by way of example only, and with reference to the accompanying figures in which.

DETAILED DESCRIPTION

Figure 1:
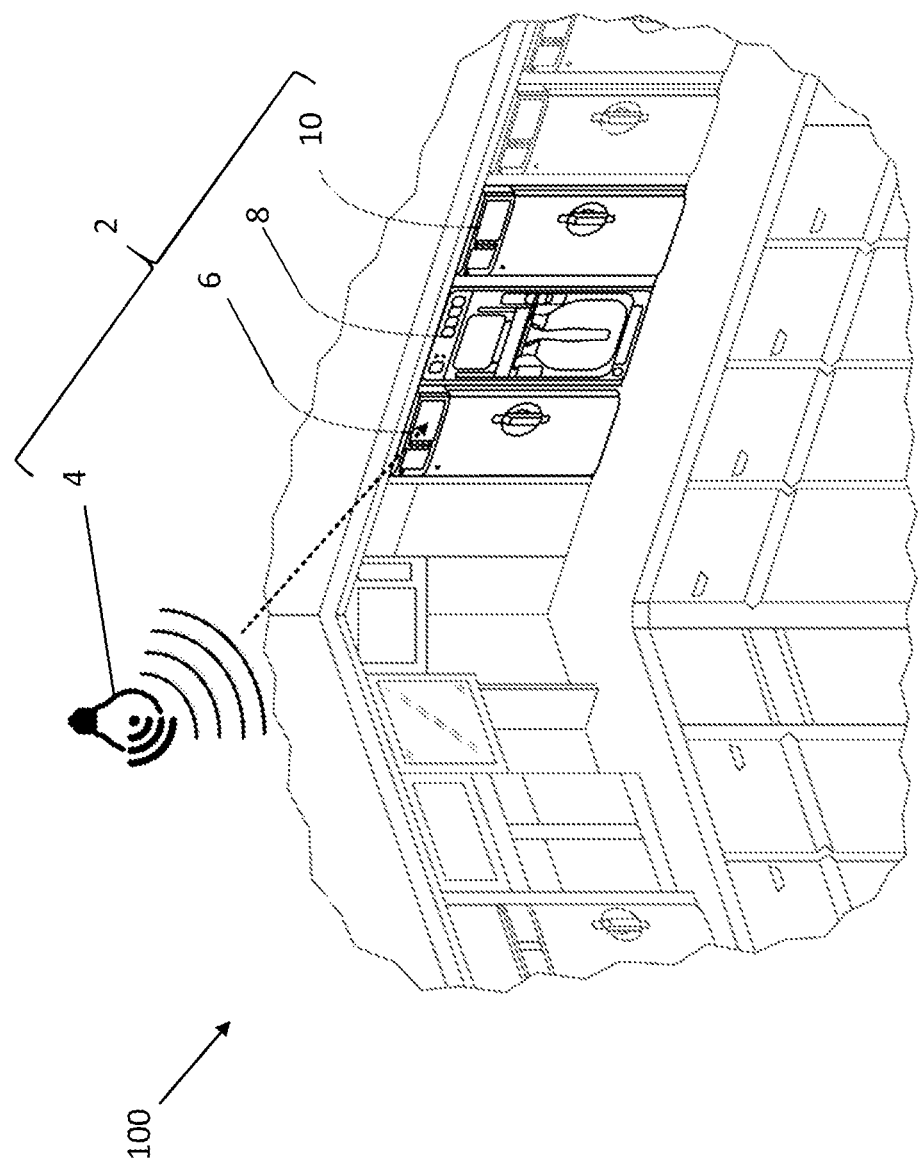
FIG. 1 is a partial view of an aircraft galley featuring an aircraft cabin equipment system according to an example of the present disclosure.

FIG. 1 shows part of an aircraft galley 100. The galley 100 features an aircraft cabin equipment system 2 comprising a light fitting 4 in a ceiling of the galley 100 and three aircraft cabin devices: an oven 6, a chiller 8 and a coffee maker 10. In some other examples the aircraft cabin equipment system may include other galley devices and/or cabin devices located elsewhere in an aircraft.

Figure 2:
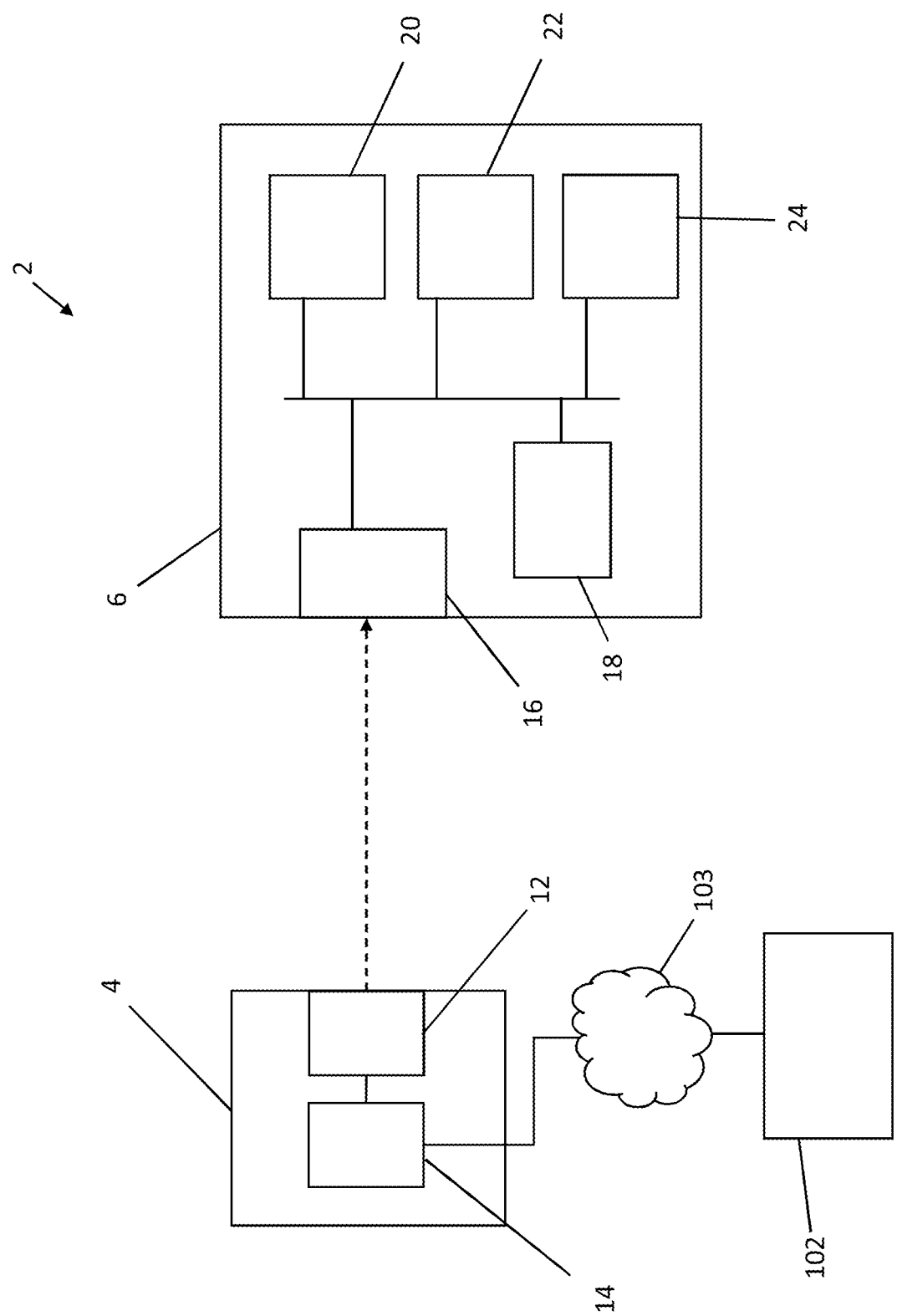
FIG. 2 is a block diagram of the aircraft cabin equipment system.

Part of the aircraft cabin equipment system 2 is shown schematically in FIG. 2. As illustrated in FIG. 2, the light fitting 4 comprises an LED device 12 and a controller 14. The controller 14 is connected to an external aircraft data management system 102 via an aircraft data network 103. The aircraft data management system 102 maintains the aircraft time.

The oven 6 comprises a light detector 16, a processor 18, an internal clock 20, a sensor 22, a memory 24, along with other standard oven components such as a heating element (not shown).

During operation (e.g. during a flight of the aircraft), the Light Emitting Diode (LED) device 12 of the light fitting 4 emits visible light to illuminate the galley 100 for normal cabin crew use. The light fitting 4 may be dimmed or switched off entirely in different phases of a flight. In other examples light sources other than LEDs may be used.

The controller 14 receives time information from the data management system 102 and generates a time signal that indicates the current time. The time signal is frequently updated (e.g. every second) so that it is up-to-date with the current time. The controller 14 broadcasts the time signal by modulating the intensity of light emitted by the LED device 12 at a high frequency (e.g. sufficiently high so as not to be visually discernible)). Because the light is modulated at a high frequency, this modulation is not perceptible to users of the galley 100.

The controller 14 continuously broadcasts the time signal when the LED device 12 is used to illuminate the galley 100. When the LED device 12 is dimmed or turned off, the broadcast is paused.

Light from the light fitting 4 is detected by the light detector 16 of the oven 6. The light detector 16 detects the changing intensity of the incident light due to the modulation applied by the controller 14. The processor 18 demodulates the detected changes in the incident light to determine the time signal.

The internal clock 20 maintains an estimate of the current time, i.e. based on an estimate of the time elapsed since a previous synchronization with an external time source. For instance, the internal clock 20 may comprise a crystal oscillator and associated circuitry arranged to measure elapsed time. Every time a new time-stamp signal is determined by the processor 20, it updates the estimate maintained by the internal clock 20 (i.e. the internal clock 20 is synchronized using the time stamp signal). The internal clock 20 is thus kept in synchronization with the current time provided by the aircraft data management system 102. In periods when the broadcast of the time stamp signal is paused but the oven 6 is still powered (e.g. when light fitting 4 is dimmed or switched off), the internal clock 20 maintains its estimate of the current time. The internal clock 20 is then synchronized when the broadcast of the time stamp signal resumes.

The sensor 22 detects operations of the oven 6. For instance, the sensor 22 may detect the current operational state of the oven (e.g. switched on, actively heating, cooling down). The processor 18 uses information from the sensor 22 and the estimate of the current time from the internal clock 20 to produce a time-stamped event log of the operation of the oven 6. This log is stored to the memory 24. For instance, the log may record the times at which the oven 6 was used over the course of a flight. When the oven 6 is first switched on, it may wait to receive an initial time signal from the light fitting 4 before starting to record events.

Although not shown in FIG. 2, the fridge 8 and the coffee machine 10 each also features a light detector 16, a processor 18, an internal clock 20, a sensor 22 and a memory 24 arranged in a similar manner to those of the oven 6. The fridge and the coffee machine also detect the light emitted by the light fitting 4 and use this to keep accurate time-stamped event logs of their operation during the flight.

Because the light fitting 4 provides a continuously updated time signal to the aircraft cabin devices 4, 6, 8 in the galley 100, the devices 4, 6, 8 do not need to be manually updated every time the aircraft is started up to have an accurate estimate of the current time. They can simply wait to receive a time signal from the light fitting 4. Furthermore, the time signal can be updated as the aircraft passes through or lands in different time zones, ensuring that the times in the event logs of all the devices 4, 6, 8 are accurate and useful.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

What is claimed is:

1. An aircraft cabin equipment system comprising:
   a light fitting for illuminating an aircraft cabin by emitting visible light, said light fitting being configured to broadcast a time signal by modulating an intensity of the emitted visible light; and
   an aircraft cabin device configured to detect visible light emitted by the light fitting and to determine the time signal from the detected visible light, wherein the aircraft cabin device is configured to generate a time-stamped event log using the time signal.

2. The aircraft cabin equipment system of claim 1, wherein the light fitting is configured to broadcast additional information by modulating the intensity of emitted visible light, and the aircraft cabin device is configured to determine the additional information from the detected visible light.

3. The aircraft cabin equipment system of claim 2, wherein the additional information comprises flight information.

4. The aircraft cabin equipment system of claim 2, wherein the additional information comprises network authentication information for connecting to an aircraft data network.

5. The aircraft cabin equipment system of claim 1, comprising a plurality of aircraft cabin devices, each aircraft cabin device being configured to detect visible light emitted by the light fitting and to determine the time signal from the detected visible light.

6. The aircraft cabin equipment system of claim 1, wherein the aircraft cabin device comprises an internal clock and wherein the aircraft cabin device is configured to synchronize its internal clock using the time signal.

7. The aircraft cabin equipment system of claim 1, wherein the aircraft cabin device is configured to connect to an aircraft data network, and to use the time signal when connecting to the aircraft data network.

8. The aircraft cabin equipment system of claim 1, wherein the aircraft cabin device is an aircraft galley device.

9. The aircraft cabin equipment system of claim 1, wherein the light fitting is mounted in or on the ceiling of an aircraft cabin.

10. The aircraft cabin equipment system of claim 1, wherein the light fitting is configured to broadcast time signals intermittently.

11. The aircraft cabin equipment system of claim 1, wherein the system enables only one-directional communication between the light fitting and the aircraft cabin device using modulated visible light.

12. The aircraft cabin equipment system of claim 1, wherein the light fitting is configured to modulate an intensity of the emitted light according to a Li-Fi protocol.

13. The aircraft cabin equipment system of claim 1, wherein the light fitting is configured to produce a light output of at least 100 lumens.

* * * * *